United States Patent [19]

Vogelmann

[11] Patent Number: 4,885,519
[45] Date of Patent: Dec. 5, 1989

[54] METHOD AND APPARATUS FOR DETERMINING THE FLUX VECTOR OF A ROTATING-FIELD MACHINE

[75] Inventor: Heinrich-Karl Vogelmann, Eppingen, Fed. Rep. of Germany

[73] Assignee: Siemens Aktiengesellschaft, Munich, Fed. Rep. of Germany

[21] Appl. No.: 141,406

[22] Filed: Jan. 4, 1988

[30] Foreign Application Priority Data

Jan. 9, 1987 [DE] Fed. Rep. of Germany ....... 3700524

[51] Int. Cl.$^4$ .............................................. H02P 5/40
[52] U.S. Cl. ...................................... 318/800; 318/805
[58] Field of Search ........................ 318/800, 803, 805

[56] References Cited

U.S. PATENT DOCUMENTS

| | | |
|---|---|---|
| 3,909,688 | 9/1975 | Blaschke et al. |
| 4,593,240 | 6/1986 | Blaschke |
| 4,629,961 | 12/1986 | Blaschke |
| 4,680,695 | 7/1987 | Kerkman et al. ................. 318/800 |

FOREIGN PATENT DOCUMENTS 0127158 5/1984 European Pat. Off.

OTHER PUBLICATIONS

Rowan et al., "A New Synchronous Current Regulator and a Analysis of Current Regulated PWM Inverters", IAS8521C, pp. 487–495.

Primary Examiner—David Smith, Jr.
Attorney, Agent, or Firm—Kenyon & Kenyon

[57] ABSTRACT

A method and apparatus for determining the flux vector of a rotating-field machine that enables a rotating-field machine, especially a permanently excited synchronous machine, to be controlled without mechanical transmitter even at low frequencies. An EMF vector is interated in a flux computer to determine a direction angle of a model flux vector. The flux vector rotates a perpendicular correction vector until an oscillating stator current component parallel to the model flux vector generates no corresponding oscillations in the stator current component perpendicular thereto. Preferably, a multiplier forms a correlation signal between the impressed oscillating stator current component and the oscillations in the stator current component perpendicular thereto. The correlation signal indicates the value of the components of the correction vector perpendicular to the model flux vector.

11 Claims, 2 Drawing Sheets

METHOD AND APPARATUS FOR DETERMINING THE FLUX VECTOR OF A ROTATING-FIELD MACHINE

BACKGROUND OF THE INVENTION

1. Field of the Invention

The invention relates to a method for determining the flux vector of a rotating field machine on which a stator current vector is impressed with a frequency changer. The invention further relates to the application of the method to the operation of the rotating-field machine, a device for determining the flux vector of the rotating-field machine and a method for operating this device.

2. Description of Related Art

Field oriented controls are known for the highly dynamic operation of rotating-field machines that use two mutually independent reference values. These reference values determine the component of the stator current vector parallel and perpendicular to the flux vector in a coordinate system rotating synchronously with the flux. A control uses the direction angle of the flux vector to transform the coordinate system of the machine stator winding while at rest. This transformation is connected with a corresponding stator current control and furnishes the setting signals for a frequency converter. The frequency converter then impresses the three phase winding on the stator winding which corresponds to the reference vector formed from the reference values of the components.

The information about the flux vector required for this field-oriented control, including at least its direction, can be calculated from the stator voltage and the stator current using a "voltage model". The EMF vector is determined in the stator oriented reference system. A model vector of the flux is then calculated by vectorial integration. The stator voltage assumes only small values at low frequencies. Noise is superimposed on the stator vector with such strength that the EMF vector can be determined with reasonable reliability only at higher frequencies. Furthermore, a null drift of the measuring members and integrators combine with other calculating errors to cause an erroneous d-c component to be calculated into the model vector.

The errors associated with the voltage model can be overcome using the "current model". This latter model measures a value for the rotor position and calculates the flux from the measured stator currents and a parameter for the rotor time constant. It therefore simulates in the machine electrical processes leading to the build-up of the flux. The current model, however, is dynamically inferior to the voltage model, especially at higher frequencies.

West German Patent No. 3 319 350 discloses a combination of both the voltage and current models. The model vector is calculated by the integration of a sum vector formed from the EMF vector and a correction vector. The components of this correction vector are given in a coordinate system oriented toward the model vector in such a manner that the control deviation of the magnitude of a model vector from the reference value of the flux is averaged by the component of the correction vector that is parallel to the model vector. The difference angle between a model vector and a second model vector that is calculated in a current model perpendicular to the model vector is averaged via the component perpendicular to the model vector.

European Patent No. 71, 847 proposes adding "magnetizing current" to the field-parallel component. The "magnetizing current" is an oscillating supplemental reference value that is used to calculate the rotor time constant required in the current model. An oscillating component is then impressed on the stator current vector of the machine in the component parallel to the field. The component of the stator current vector that is perpendicular to the field, the "active current", determines the torque. This perpendicular component is not influenced by the supplemental reference value. The supplemental reference value acts on the true magnetizing current belonging to the true flux vector as well as on the true active current in the event of a misadjustment of the parameter used in the current model for the rotor time constant and a miscalculation of the flux vector connected therewith. The oscillations of the supplemental reference value are also noted in the torque. Multiplication of the measurement value of these torque variations by the time-delayed supplemental reference value followed by subsequent integration forms a correlation signal that is zero only if the model value of the flux coincides with the true flux vector. The correlation signal is therefore used to readjust the rotor time constant of the current model until the correlation signal disappears.

The flux of a synchronous machine also can be calculated if the rotor winding and the field current are included in the current model. However, the current model fails for permanently excited machines. Another decisive disadvantage is the requirement for a complicated mechanical transmitter to determine the rotor position.

West German Patent No. 35 42 941 discloses an apparatus where a high-frequency current is impressed on a stator winding that is partially cross-coupled into the other stator windings. The cause of this cross-coupling is primarily an asymmetry caused by the flux vector of the effective impedances in the machine. The amplitudes of the cross-coupled high frequency signal depend on the different angle between the impressed high frequency current and the field vector. The envelopes of these signals can be used directly as a substitute for the signal of the mechanical transmitter.

SUMMARY OF THE INVENTION

The present invention produces another approach to determine the flux vector of a rotating-field machine that does not use a mechanical transmitter.

The present invention relates to an apparatus for determining the flux vector of a rotating field machine supplied by a converter. Means are supplied to form an EMF vector from the current and voltage of the rotating field machine. A correction vector is added to the EMF vector before vectoral integration. A clock frequency generator supplies the oscillating modulation signal. A current controlling device forms a direction signal from the modulation signal and reference values to fix the components of the stator current vector. A correlation detector forms a correlation signal from the modulation signal and a signal corresponding to the actual value of the perpendicular component of the stator current vector. The output of the integrator circuit comprises a correction vector. The output of a correlation detector comprises a vector having a magnitude proportional to the correlation signal and is fed back to the input of the integration circuit.

The present invention comprises a method for determining the flux vector of a rotating field machine. The stator vector is impressed on a frequency charger with an oscillatory component that is parallel to a model flux vector. The model flux vector is calculated from the stator current vector, the stator voltage vector and the EMF vector by adding a correction vector to the EMF vector and integrating the resulting sum vector. The component of the correction vector that is perpendicular to the model flux vector is changed to minimize the harmonic having the impressed oscillatory frequency.

The present invention has particular application to forming a permanently excited synchronous machine where the stator vector is formed from field oriented reference values that are transformed by the model flux vector into stator oriented control values for the frequency charger. Further, a rotating field machine of the present invention can be started from a standstill position with the correct field orientation.

The preferred field of application of the present invention is the field-oriented operation of synchronous machines. A permanently excited synchronous machine has a rotor with a completely rotation-symmetrical damper winding such as a rotor cage. The components that are parallel and perpendicular to the preferred direction of the fed-in, high-frequency current cause the components of the resulting flux vector induced in the rotor to contain high-frequency components in these two directions. The high frequency components are proportional to the impressed high-frequency current but have different proportionality factors. This high-frequency component therefore corresponds to a vector that is shifted in direction relative to the fed-in current. This vector therefore has a component that is perpendicular to the direction of the impressed high-frequency current. The armature reaction couples the perpendicular component the electrical characteristic of the stator winding where it can be measured. The coupling depends on the difference angle between the impressed high-frequency current and the preferred direction of the rotor and can be used to identify the position of the rotor or the flux, respectively. The direction of the impressed high-frequency current can be changed until the perpendicular coupled in component of the corresponding vector (flux vector, stator voltage vector or in particular, stator current vector) reaches a minimum. In the balanced state, a fixed angle relationship then prevails between the direction of the impressed high-frequency current and the axis of the rotor or the flux.

The invention comprises a method for determining the flux vector of a rotating-field machine on which a stator current vector is impressed via a frequency changer. An oscillating component having given oscillation frequency is impressed on the components of the stator current vector or of a signal related to this perpendicular component determines the harmonic that has the oscillating frequency.

DETAILED DESCRIPTION

Figure 1:
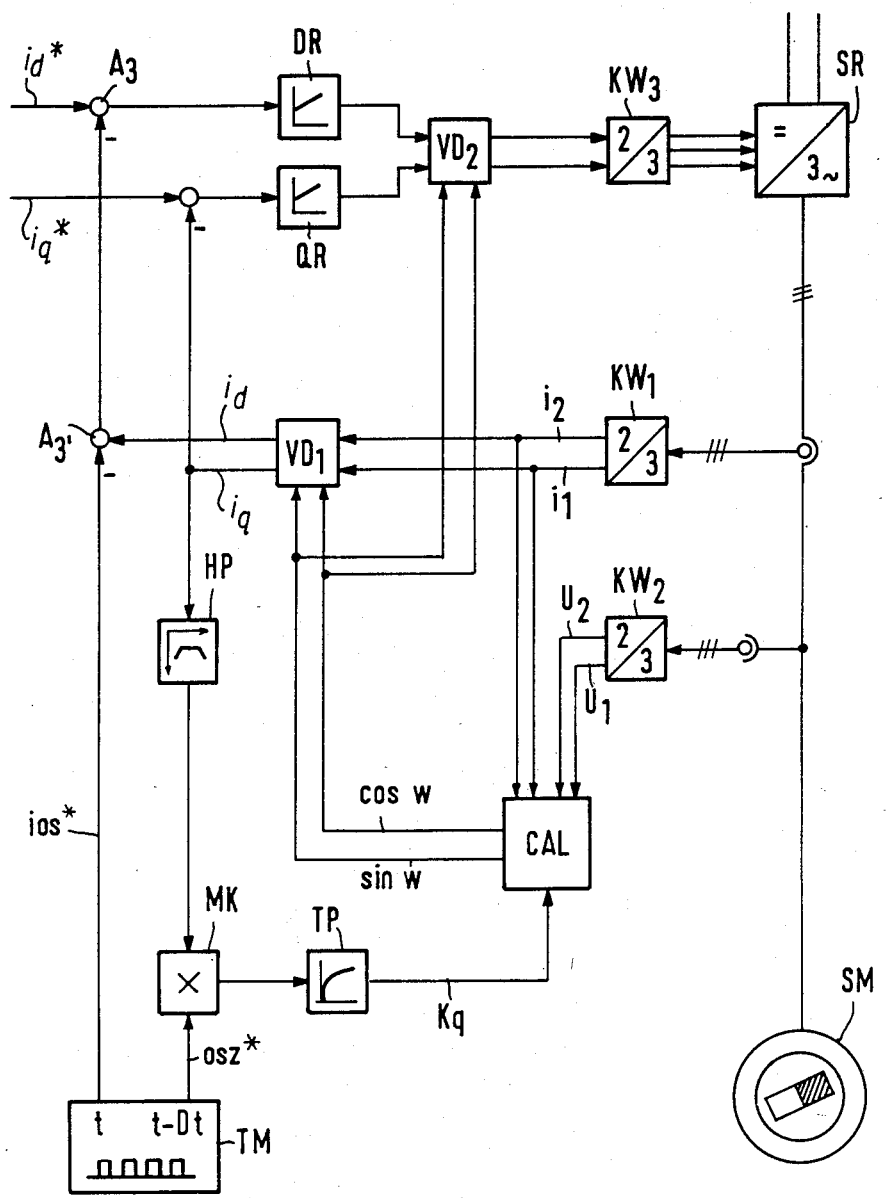
FIG. 1 shows the design of a device according to the invention.

As shown in FIG. 1, the model flux vector is computed in a flux computer CAL which first forms an EMF vector from the stator current and the stator voltage. If the components of the stator voltage vector U, the stator current vector I, the stator flux vector F and the EMF vector E are designated with $U_1$ and $U_2$, and $i_1$ and $i_2$ and $F_1$, $F_2$ and $E_1$, $E_2$, respectively, and with $R_s$ the resistance of the stator winding, one obtains from the voltage balance of the stator $$E_1 = U_1 - R_s \times I_1 = d(F_1)/dt, \text{ and}$$

$$E_2 = U_2 - R_s \times I_2 = d(F_2)/dt.$$

Figure 2:
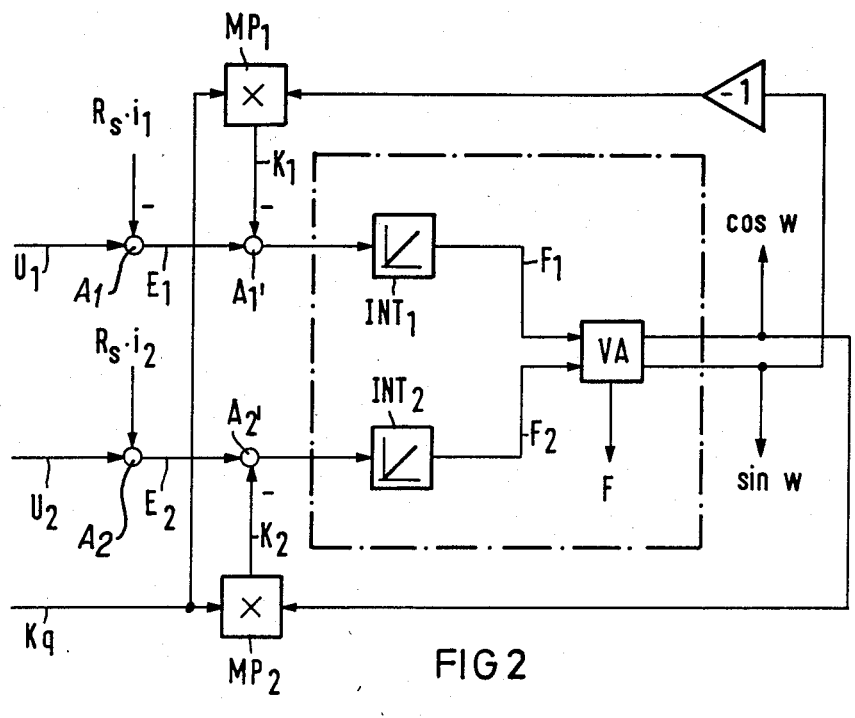
FIGS. 2 and 3 show alternate embodiments of the present invention.

The components of the flux vector in the stator references system are therefore obtained as integrals which are measured, according to FIG. 2, at the outputs of the integrators $INT_1$ and $INT_2$. The integrands are formed at addition points $A_1$ and $A_2$ from measured values for the components of the stator current vector and the stator voltage vector. In FIG. 1, these components are measured via ⅔ coordinate converters $KW_1$ and $KW_2$, respectively, at corresponding measurement members for the electrical quantities of the stator winding. The circuit for integration of the EMF vector is supplemented in FIG. 2 by a vector analyzer VA. The amplitude output of the vector analyzer has an amplitude $$F = \sqrt{F_1^2 + F_2^2} .$$

The angle output of the quantities cos w and sin w can be measured. The angle of the field axis in the stator-related coordinate system is given by $w = \tan^{-1}(F_2/F_1)$.

In order to explain the invention, it is first assumed that the points $A_1$ and $A_2$ could be formed so that the EMF components $E_1$ and $E_2$ and the integration circuit has no integration error. The components $i_1$ and $i_2$ of the actual current vector can then be converted by a vector rotator $VD_1$ (FIG. 1) using the model flux vector calculated in the computer CAL. The angle signal cos w, sin w are converted into the components $i_d$ and $i_q$ in a coordinate system rotated by angle w. In the ideal case the model flux vector assumes the direction of the actual flux axis. The component id of the stator current vector parallel to the model flux vector is identical to the components parallel to the actual field axis. The same is true for the stator current component iq perpendicular thereto.

The EMF components and the output signals of the integrators, however, almost always have measurement and computing errors. The model flux vector therefore does not represent the actual flux vector. A correction vector is added to the EMF vector at the input of the integration circuit which has a component Kq perpendicular to the model flux vector which assumes the value 0 only if the model vector and the flux vector point in the same direction. The component Kq perpendicular to the model flux vector corresponds to a correction vector K that has a component parallel to the model flux vector with the value Kd=0. The correction vector K must be transformed into the stator reference system for the vectorial additional to the EMF vector calculated in the stator reference system. As shown in FIG. 2, the components $K_1 = -Kq \times \times \sin w$ and $K_2 = Kq \times \cos w$ are formed by corresponding multipliers $MP_1$ and $MP_2$ added at the addition point $A_1$ and $A_2$ to the EMF components. For $Kq \neq 0$, this correction vector has the effect that the integrands of the integration circuit represent a vector rotated relative to the EMF vector so that the direction w of the calculated model flux vector is also changed. For a decreasing correction vector component Kq, the model flux vector is rotated into the direction of the true flux vector by the negative valuation of the correction vector at the addition points $A_1$ and $A_2$.

An oscillating component parallel to the model vector can be impressed with an oscillating supplemental reference value with preferably a sinusoidal value ios*. Calculating the error of the model vector in the stator current component perpendicular thereto, which can be measured at the iq output of the vector rotator $VD_1$, produces a harmonic that is correlated with ios* and has the same oscillation frequency. If the correction vector component Kq is changed until this correlated component at the iq output disappears, the angle w of the model vector is rotated until the model vector and the actual flux vector are parallel. The model vector then represents at least the desired direction of the flux vector.

As shown in FIG. 1, the oscillator stator current component parallel to the model flux vector is impressed via the field-oriented control of the rotating-field machine. FIG. 1 shows symbolically the preferred case of a synchronous machine which is preferably a permanently excited synchronous machine SM. In normal operation, the torque of the machine is given by a reference value id* for the field-parallel stator current component. The value id*, for example, can be taken off at the output of a speed controller. The oscillating supplemental reference value ios* and control comparison are super positioned with the actual value id. The addition points $A_3$ and $A_3'$ form the input signal of a current controller DR. The output signal forms the d-c component of a control vector. Similarly, a current controller QR can be formed from the control deviation of the stator current component iq that is perpendicular to the model flux vector. The q component of this control vector is given by a corresponding operationally determined reference value iq*. A vector rotator $VD_2$ is likewise fed by the angle signal, cos w, sin w, and furnishes the transformation inverse to the vector rotator $VD_1$ from the dq coordinate system into the stator oriented 1, 2-coordinate system. The stator-oriented components of the control vector are converted, for example, using a 2, 3 coordinate converter $KW_3$ into the components of a three-phase system. These control quantities each control the values of a frequency converter SR that work with one of the three stator terminals.

The correlation between the impressed oscillating components of the parallel stator current component and a measured value for the other component of the stator current vector can be measured using the harmonic of the signal that is associated with the components of the stator current vector perpendicular to the model flux vector. From this measurement is formed the amplitude Kq for the perpendicular component of the correction vector.

If the oscillation frequency is $w_o$ and the supplemental reference value is $ios^* = x \cdot \sin(w_o t)$, then a harmonic is superimposed on a component y'(t) in the component id which is given by iq* and is only slightly variable relative to the oscillation frequency. The amplitude y of the oscillation frequency $w_o$ and a phase shift p given by the transfer function of the control circuit gives $iq = y \cdot \sin(w_o t + p) + y'(t)$. If one now forms the correlation coefficient $$Kq(Dt) = \lim_{T \to \infty} \int_{-T/2}^{+T/2} (osz^*(t - Dt) \cdot iq) dt,$$

where osz*(t−Dt) is the signal of the impressed oscillating stator current component delayed by a delay time Dt, one obtains $Kq(Dt) = x \cdot y \cos(p + w_o Dt)$. The non correlated component Y'(t) therefore exhibits nothing and a maximum correlation signal results if $Dt = -p/w_o$.

FIG. 1 provides for measuring the modulation clock generator Tm, the supplemental reference value ios* and the corresponding phase delayed signal osz*. The delay of osz* relative to ios* is set to the modulation frequency $w_o$ and the phase delay p of the control circuit. For forming the correlation signal it is sufficient to integrate the product (iq·osz*) over a finite time such as at least one period of the modulation clock frequency. A low pass filter TP follows the corresponding multiplier MK for this purpose. The multiplier MK is preferably preceded by a high pass filter HP such as a second order filter. This high pass filter suppresses a ripple of the correlation signal which is presented in the product (osz*id), since the component y'(t) contained in iq changes only little and is not completely leveled out by the finite integration time of the low pass filter. Low-frequency components of iq, given by the torque-forming reference value iq*, are shielded from the high pass filter and do not contribute to the formation of the correlation. Elements HP, MK and Tp together form a correlation detector.

A suitable choice of the oscillation frequency can present the harmonics in the internal voltage of the synchronous machine caused by the frequency converter from having a sufficient frequency spacing from the modulation frequency to interfere with a formation of the correlation signal. A steep increase of the stator current must generally be avoided by a rate-of-rise limiter for the reference value iq* for the operation of the frequency converter. This objective can be obtained using a suitable limiter circuits in the formation of the reference value. The high pass filter HP furnishes only signals which are correlated with the supplemental reference value ios*.

A synchronous machine supplied via a direct converter, such as an externally excited synchronous machine with damper windings, can use this method. The harmonics caused by operation of the direct converter of the stator current are sufficient to form the correlation signal. No modulation clock generator having its own modulation frequency is required. The value of osz* can be derived from the control signal of the direct converter, i.e., the firing process of the converter valves. These firing pulses describe the impressed oscillating current components and can therefore be utilized for the formation of the correlation signal. A supplemental reference value ios* is therefore not necessary.

The circuit shown in FIG. 2 causes the direction of the model vector to rotate by the component Kq of the correction vector into the direction of the true field axis. The amplitude of the model flux vector can be further falsified by the measurement and computing errors mentioned above. An amplitude correction can be achieved by a component of the correction vector parallel to the model vector. This parallel correction vector component is likewise changed until the amplitude of the model vector coincides approximately with the true flux vector or a corresponding input quantity F* which determines, for instance, the flux vector of the machine via the magnetizing component iq* of the reference stator current vector.

Figure 3:
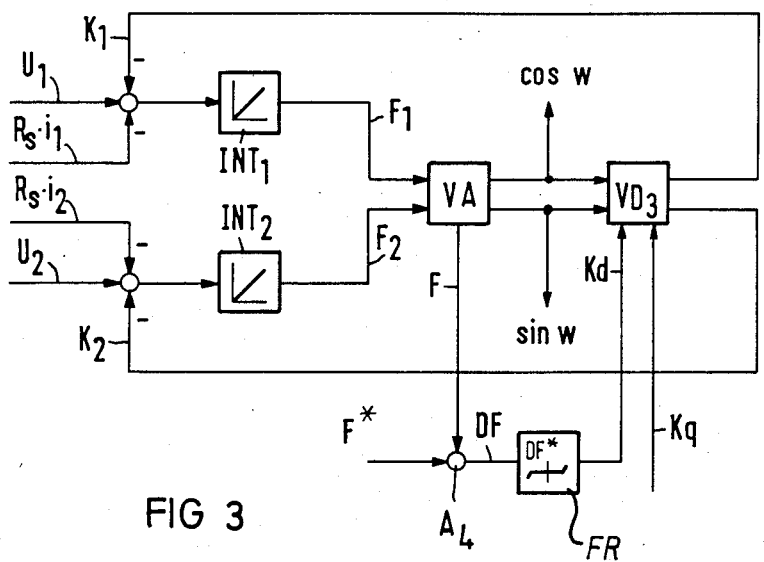

FIG. 3 shows that the amount F of the model flux vector measured at the vector analyzer VA compared with F* at comparison point A4. In a permanently excited synchronous machine, for example, the amplitude of the air gap flux moves within a certain range about the amplitude of the permanently existing excitation flux. The magnitude F* of the constant excitation flux is subtracted from the model flux (addition point A4), to obtain the difference DF. If the model flux vector is computed correctly, F* is located within a tolerance band ±DF* because of the change in time of the air gap flux. In the embodiment shown in FIG. 3, a corresponding characteristic member FR therefore forms, the parallel component Kd of the correction vector. This component can, for example, be set proportional to the excess over the tolerance bandwidth DF*.

In the stator reference system, the component of Kd which is parallel to the flux vector, has the components $Kd_1 = Kd \times \cos w$ and $KD_2 = Kd \times \sin w$. The total correction vector which is composed of the two components Kq and Kd, referred to the model flux vector, thus has the stator related components $K_1 = Kd \times \cos w - Kq \times \sin w$; and $K_2 = Kd \sin w + Kq \cos w$. This correction vector corresponds to the transformation of a vector with the two orthogonal components Kd and Kq into a coordinate system rotated by the angle $-w$. A vector rotator, such as VD3 in FIG. 3, can be used for this coordinate transformation.

The method shown in FIG. 1 is particularly well suited for the field-oriented operation of the rotating field machine at low speeds. At high speeds, the flux computer CAL determines the model flux vector with sufficient accuracy. The modulation clock frequency can therefore be switched off so that Kq=Kd=0.

The method according to the present invention can determine whether the control circuits for iq and id are decoupled when the machine is turned on for the first time. The axis of the model flux vector effectively agrees with the rotor or flux axis. This state, however, is the case for antiparallelity between the true and the calculated flux.

The foregoing uncertainty can be eliminated. At standstill, the integrators INT1 and INT2 are first set to an arbitrary estimated value of the flux vector. For example, F1 can be set for F0 and F2=0, where F0 is a value for the approximately know flux amplitude. The current controllers are initially still blocked. The flux computer CAL therefore initially furnishes the transformation angle w=0 for the vector rotators. The parallel component of the stator current vector has a finite reference value for the perpendicular component iq*=0. The current controllers DR and QR therefore impress on the rotating-field machine SM a stator current vector with the components $i_1 = id^*$, $i_2 = 0$. The position of the pole wheel initially can be any value. The constant stator current vector, together with the rotor flux, generates a torque which turns the rotor parallel to the stator current vector. The true flux vector assumes the direction angle 0 degrees to which the integrators are set and held. No torque is generated if the rotor flux happens to have the opposite direction at the starting value of the stator current vector. However, this position is unstable so that the pole wheel does not remain fixed. The pole wheel therefore moves to the direction of the model flux vector and the stator current vector is parallel thereto.

The integrators can be released while the modulation clock frequency is switched on once the foregoing transient motion has decayed. Thus the machine can be brought up to speed by raising the torque-determining reference value iq* which can be provided, for instance, by a now released speed controller. From a predetermined switch on speed such as 10% of the nominal speed, the modulation can be turned off again. Subsequent to the switch-on process and the release of the modulation clock frequency, the rotating field machine can be operated in an operating range that includes substantially zero speed. No significant null drift of the integrator or other computer errors need occur.

What is claimed is:

1. A method for determining a flux vector of a rotating field machine having a stator current vector impressed by a frequency changer comprising:
   (a) calculating a model flux vector by:
      (i) forming an EMF vector from the stator current vector and the stator voltage, said EMF vector having a resultant direction;
      (ii) vectorially adding a correction vector to said EMF vector to change said direction of said EMF vector to form a resulting sum vector; and
      (iii) integrating the resulting sum vector to form a model flux vector;
   (b) impressing an oscillating component of a given oscillation frequency on a component of said stator current vector that is parallel to said calculated model flux vector;
   (c) determining a harmonic having an oscillation frequency associated with a component of said stator current vector that is perpendicular to said calculated flux vector; and
   (d) changing a component of said correction vector that is perpendicular to the model flux vector as a function of said determined harmonic until the amplitude of said determined harmonic becomes a minimum.

2. The method according to claim 1, and further including forming a correlation signal representing the correlation between the impressed oscillating component of the parallel component and a signal of the other component of the stator current vector as a measure of the determined harmonic and determining, proportionally thereto, the value of the perpendicular component of the correction vector.

3. The method according to claim 2, and further comprising controlling the components of the stator current vector parallel and perpendicular to the model flux vector to respective reference values; adding an oscillating supplemental reference value to the reference value of the parallel component; and forming, as the correlation signal, the product of the signal for the perpendicular component of the stator current vector and said supplemental reference value delayed with a time constant depending on the oscillation frequency.

4. The method according to claim 3, and further including passing the signal for the perpendicular component of the stator current vector through a highpass filter.

5. The method according to claim 3, and further including passing the product through a lowpass filter.

6. The method according to claim 1, comprising determining the parallel component of the correction vector from the magnitude of the model vector and an input quantity for the magnitude of the flux vector.

7. The method according to claim 1 in combination with a rotating field machine, wherein field-oriented reference values for the two components of the stator vector are given and further comprising transforming said values by means of the model flux vector into stator-oriented control quantities for the frequency changer.

8. Apparatus for determining a model flux vector of a converter-supplied rotating-field machine comprising:

(a) a frequency changer for impressing a stator current vector on said machine;

(b) means, including an integration circuit for vectorial integration, for forming an EMF vector from the current and voltage of the rotating-field machine and for the vector addition of a correction vector to said EMF vector at the input of said integration circuit, said EMF vector forming means generating a direction angle signal at its output;

(c) a clock frequency generator forming an oscillating modulation signal;

(d) a current controlling device having as inputs said modulation signal and reference values which fix said stator current vector and said direction angle signal, said EMF vector forming means controlling said frequency changer;

(e) a correlation detector having as inputs said modulation signal and a signal corresponding to the actual value of a perpendicular component of said stator current vector, for forming a correlation signal as an output; and (f) a correction vector former for forming a correction signal, the correction vector former having inputs connected to receive said direction angle signal and said output of said correlation detector, said correction vector former forming a vector having a component perpendicular to the model flux vector that is proportional to the correction signal at its output, said output of said correction vector former being fed back to said integration circuit as said correction vector.

9. Apparatus according to claim 8, wherein a vector rotator is included by the correction vector former.

10. Apparatus according to claim 8 and further including a comparator at the input of said vector rotator comparing the amplitude of the model flux vector and an input quantity for the amount of the flux.

11. A method for operating the flux vector of a converter-supplied rotating-field machine which includes:

(a) a frequency changer impressing a stator current vector on said machine;

(b) means, including an integration circuit for vectorial integration, for forming an EMF vector from the current and voltage of the rotating-field machine and for the vector addition of a correction vector to the EMF vector at the input of said integration circuit;

(c) a clock frequency generator forming an oscillating modulation signal;

(d) a current controlling device having as inputs said modulation signal and reference values which fix the components of the stator current vector, and a direction angle taken off at the output of the integrating circuit. providing at its outputs control signals for said frequency changer;

(e) a correlation detector having as inputs the modulation signal and a signal corresponding to the actual value of the perpendicular components of the stator current vector forming as an output a correlation signal; and (f) a correction vector former having as inputs the output signal of the integrator circuit and the output of said correlation detector forming a vector having a component perpendicular to the model vector proportional to the correction signal at its output, said output being fed back to the input of the integration circuit as said correction vector, comprising while at a standstill;

(i) first setting in said integrator to an arbitrary estimated value of the flux vector;

(ii) setting in the controlling device a finite value for the component parallel to the model flux vector and practically zero as the reference value for the perpendicular reference value component of the stator current vector;

(iii) releasing the control device and switching on the clock frequency generator after the decay of transients and the integrators are released.

* * * * *